R. H. SIKES.
POWER STITCHER FOR RETREADING AUTOMOBILE TIRES.
APPLICATION FILED APR. 15, 1918.
1,283,337.
Patented Oct. 29, 1918.
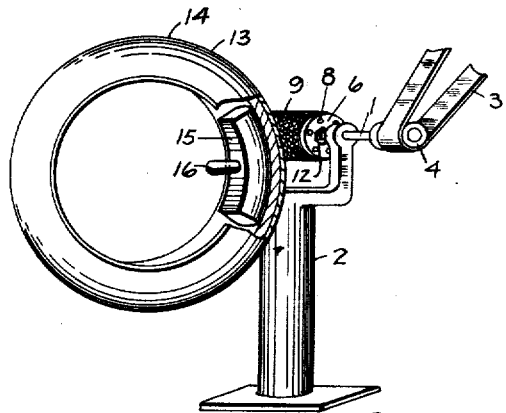
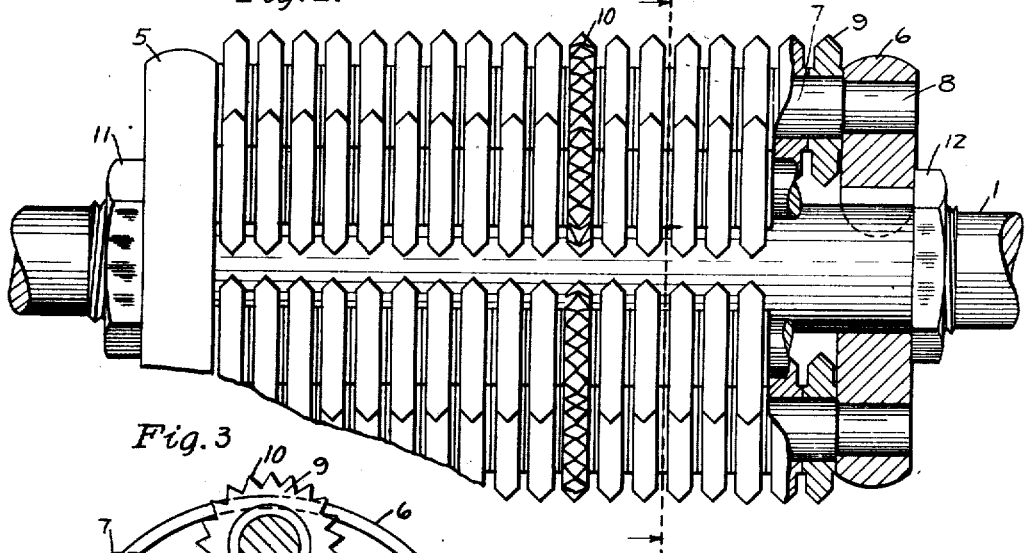
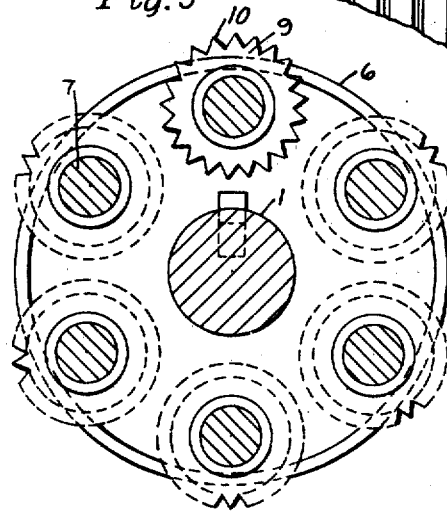
Inventor:
Russell H. Sikes,
by Hazard & Miller
Att'ys.

UNITED STATES PATENT OFFICE.

RUSSELL H. SIKES, OF LOS ANGELES, CALIFORNIA.

POWER-STITCHER FOR RETREADING AUTOMOBILE-TIRES.

1,283,337.

Specification of Letters Patent.　　Patented Oct. 29, 1918.

Application filed April 15, 1918.　Serial No. 228,811.

*To all whom it may concern:*

Be it known that I, RUSSELL H. SIKES, a citizen of the United States, residing at Los Angeles, in the county of Los Angeles and State of California, have invented new and useful Improvements in Power-Stitchers for Retreading Automobile-Tires, of which the following is a specification.

My object is to make a power stitcher for re-treading automobile tires and my invention consists of the novel features herein shown, described and claimed.

Figure 1 is a perspective showing a power stitcher embodying the principles of my invention in use.

Fig. 2 is an enlarged detail of the rotating head, parts being broken away and parts being shown in sections.

Fig. 3 is a cross section on the line 3—3 of Fig. 2.

A shaft 1 is mounted in a stand 2 like an emery grinder; a drive belt 3 runs over a pulley 4 on the shaft 1; heads 5 and 6 are rigidly keyed upon the shaft 1; and spindles 7 have reduced ends 8 mounted in the heads 5 and 6, said spindles being arranged in a concentric row around the shaft 1.

Stitching wheels 9 are loosely mounted upon the spindles 8 between the heads 5 and 6, said stitching wheels having the usual stitching teeth 10 upon their peripheries; and nuts 11 and 12 are screwed upon the shaft 1 against the heads 5 and 6, the ends of the shaft outside of the nuts being reduced to the depth of the screw threads.

When the new rubber 13 has been applied to the casing 14, the machine is started to run at a high rate of speed, preferably about five hundred revolutions per minute and the casing is manipulated to bring the new rubber in contact with the stitching teeth so as to securely stitch the new rubber to the old casing.

In order that the casing may be stiff for manipulation a form 15 is placed inside of the cavity of the casing and provided with a handle 16 which projects from the inner side of the casing. This form 15 may be made of wood, plaster of paris and the like. The operator moves the form 15 by the handle 16 in the casing, as he presents a new surface of the tread to the action of the stitcher.

Various changes may be made without departing from the spirit of my invention as claimed.

I claim:

1. A power stitcher for use in retreading automobile tires comprising a stand, a shaft rotatably mounted horizontally upon the stand, a pulley for driving the shaft, heads fixed upon the shaft, spindles fixed between the heads in a row around the shaft, and a plurality of toothed wheels loosely mounted upon the spindles.

2. In a retreading stitcher, a shaft; heads fixed upon the shaft; spindles fixed between the heads in a row around the shaft, and a plurality of toothed wheels loosely mounted upon the spindles.

In testimony whereof I have signed my name to this specification.

RUSSELL H. SIKES.

Copies of this patent may be obtained for five cents each, by addressing the "Commissioner of Patents, Washington, D. C."